US012128647B2

(12) United States Patent
Claudon et al.

(10) Patent No.: US 12,128,647 B2
(45) Date of Patent: Oct. 29, 2024

(54) BLADE AND CREPING ARRANGEMENT

(71) Applicant: Voith Patent GmbH, Heidenheim (DE)

(72) Inventors: Alexandre Claudon, Cheseaux-Noreaz (CH); Pierre-Yves Pfirter, Monnaz (CH)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 18/683,560

(22) PCT Filed: Jul. 26, 2022

(86) PCT No.: PCT/EP2022/070877
§ 371 (c)(1),
(2) Date: Feb. 14, 2024

(87) PCT Pub. No.: WO2023/020793
PCT Pub. Date: Feb. 23, 2023

(65) Prior Publication Data

US 2024/0262071 A1 Aug. 8, 2024

(30) Foreign Application Priority Data

Aug. 16, 2021 (EP) ..................................... 21191419

(51) Int. Cl.
*B31F 1/14* (2006.01)
*D21G 3/00* (2006.01)
*D21G 3/04* (2006.01)

(52) U.S. Cl.
CPC ............. *B31F 1/145* (2013.01); *D21G 3/005* (2013.01); *D21G 3/04* (2013.01)

(58) Field of Classification Search
CPC ......... B31F 1/145; B31F 1/126; D21G 3/005; D21G 3/04
USPC ........ 162/280, 281, 361; 264/282, 283, 284; 156/209; 15/236.01
See application file for complete search history.

(56) References Cited

U.S. PATENT DOCUMENTS 3,869,344 A 3/1975 Hunt
4,482,429 A 11/1984 Klowak
6,207,021 B1 3/2001 Eriksson et al.
6,425,983 B1 7/2002 Marinack et al.
6,451,166 B1 * 9/2002 Marinack ................ D21F 11/14 162/111
6,540,879 B2 * 4/2003 Marinack ................ B31F 1/145 162/113
6,709,548 B2 * 3/2004 Marinack ................ D21F 11/14 162/111

(Continued)

FOREIGN PATENT DOCUMENTS

CA 3228917 A1 * 2/2023 .............. B31F 1/145
EP 1878565 A1 * 1/2008 .............. B31F 1/145

(Continued)

*Primary Examiner* — Jose A Fortuna
(74) *Attorney, Agent, or Firm* — Laurence A. Greenberg; Werner H. Stemer; Ralph E. Locher

(57) ABSTRACT

A blade for creping a paper web from a dryer cylinder surface. The blade has a leading side and a front bevel surface to be impacted by the paper web. The leading side and the front bevel surface meet at a contact edge to contact the dryer cylinder. The front bevel surface has a 3D areal roughness, measured according to ISO 25178, of Sa>0.7 µm and/or Sz>18 µm and/or Sq>1.0 µm.

20 Claims, 10 Drawing Sheets

(56) References Cited

U.S. PATENT DOCUMENTS

| | | | | |
|---|---|---|---|---|
| 7,691,236 | B2 * | 4/2010 | Conn | B31F 1/145<br>162/280 |
| 8,206,556 | B2 * | 6/2012 | Claudon | B31F 1/145<br>15/256.51 |
| 2008/0023168 | A1 | 1/2008 | Conn et al. | |
| 2013/0269897 | A1 | 10/2013 | Angerler et al. | |
| 2024/0084513 | A1 * | 3/2024 | Takahashi | D21H 23/04 |

FOREIGN PATENT DOCUMENTS

| | | | | |
|---|---|---|---|---|
| EP | 4137304 | A1 * | 2/2023 | B31F 1/145 |
| GB | 2128551 | B | 11/1985 | |
| WO | WO-2023020793 | A1 * | 2/2023 | B31F 1/145 |

* cited by examiner

BLADE AND CREPING ARRANGEMENT

FIELD AND BACKGROUND OF THE INVENTION

The invention concerns a blade for creping a paper web from a dryer cylinder surface. The blade has a leading side and a front bevel surface meeting at a contact edge. The contact edge is intended to contact the dryer cylinder. The front bevel surface extends at least 150 μm from the contact edge in the thickness direction of the blade and to be impacted by the paper web. The invention also concerns a creping arrangement comprising such a blade.

It is well known in the manufacturing of paper, especially of tissue paper, to crepe the paper web from a dryer cylinder with the help of creping blades.

Creped is defined as a crinkly paper property produced by crowding a sheet of paper on a roll by means of a doctor blade, producing thereby an effect simulating crepe. In the creping process periodic folding microstructures in the tissue are formed, which can significantly increase the quality of tissue, such as softness, bulk, stretch and absorbency properties.

First a continuous wet web is pressed and adhered onto the surface of the dryer cylinder, commonly called a Yankee, with the help of adhesive chemicals. During the drying process, bonding between cellulose fibres takes place. After being dried by the hot steam and air around the Yankee dryer, the web is scraped off from the surface by a doctor blade and folding structures are formed. The action of the doctor blade, more specifically called a creping blade, is to disrupt the internal structure of the paper sheet by breaking inter-fibre bonds. Creping the paper sheet off the Yankee dryer in a controlled and uniform manner is what defines conventional tissue product manufacture.

Different fibre types can be used as raw materials to produce tissue paper. They are usually classified by their source (virgin or recycled), their type of manufacturing process (chemical, semi-chemical, mechanical, bleached, un-bleached), their type of biomass (hardwood, softwood, non-wood).

Different machine technologies are used by tissue manufacturers. Light Dry Creped (LDC) is the most conventional technology. In this case, the wet fibrous is dried at a moisture content of approximately 65% against the Yankee dryer surface and reaches the creping doctor blade at a dryness of about 90 to 95%. In the alternative conventional Wet Creped technology, the paper is creped below 85% web dryness at the creping doctor blade. Through-Air Drying (TAD) is another noticeable technology. While this later has clear disadvantages such as higher capital costs and higher energy consumption than conventional creping machines, tissue products of especially higher bulk, softness and absorbency can be produced. Other alternative technologies can be cited: Creped Through-Air Drying (CTAD), Un-Creped TAD (UCTAD), Double Re-Crepe (DRC), Advanced Tissue Molding System (ATMOS) and New Tissue Technology (NTT). All have their specific advantages and drawbacks, and more or less benefits on the main tissue properties.

Tissue products have a wide range of types and applications, including facial tissue, toilet paper, kitchen towel, hand towel, napkin and wipes. For all of these products, the doctor blade specifications and settings are of outmost importance to produce the required tissue quality such as softness, bulk and absorbency.

Bulk is a well-known quantity in papermaking and is defined as the volume occupied by a given weight of paper, which is the inverse of the density. It is an important tissue property because paper thickness (i.e., caliper) and bulk correlate well with absorbency. Absorbency (rate and capacity) is a key property for to welling and other tissue products with the purpose of wiping liquids. The water holding capacity (WHC), measured in g/g, is one indicator used commonly to evaluate absorbency. As known by skilled persons, below equations can be taken to make the link between tissue paper thickness, bulk and absorbency:

Bulk (cm3/g)=1/Density (g/cm3)=Dry thickness (μm)/Basis weight (g/m2) WTC (g/g)~60-75% of the Bulk Limited studies and prior arts have considered the effect of the creping doctor blade itself on the tissue properties. Some of them present general shapes of the blade and specific blade designs.

U.S. Pat. No. 4,482,429 A involves a creping blade having a cutting or creping angle of about 72° or less, and preferably between 52° and 64°. As explained, the bulk and absorbency of the finished web may be further enhanced by utilizing a reverse angle creping blade with such specifications.

U.S. Pat. No. 6,425,983 B1 discloses a creping blade having a plurality of notches on its upper surface; aka an undulatory creping blade. As expressed, the notches are configured to increase the caliper of the cellulosic web when the creping blade crepes the cellulosic web from an outer surface of the rotatable cylinder.

GB 2 128 551 B discloses a scraper blade having a wear resistant material at the blade tip based of different embodiments. It is indeed of an advantage to coat a wear resistant material at the blade tip intended to be in contact with Yankee dryer surface in order to increase the production time as well as to keep the creping process highly stable over time.

What is missing in the prior art is an alternative option to further increase the bulk. Consequently, there is a need in the paper industry for customers producing tissue to get an innovative creping blade that can enhance by itself the tissue bulk and absorbency properties.

SUMMARY OF THE INVENTION

Therefore, it is an object of the present invention to provide an improved blade that overcomes the short-comings of the prior art.

A second object of the invention is to provide a creping blade that could itself positively impact in a controlled way the paper thickness (i.e., caliper) and tissue bulk.

A third object of the invention is to provide a creping blade that could increase the tissue absorbency.

A fourth object of the invention is to provide a versatile solution that is relatively easy to produce and can be combined with a multitude of blade designs.

All the objects are achieved by a blade for creping a paper web from a dryer cylinder surface as claimed as well as a creping arrangement comprising such a blade as claimed.

Beneficial embodiments are given in the dependent claims.

In the context of this application the terms 'blade' and 'creping blade' are used as synonyms unless explicitly stated otherwise.

A blade for creping a paper web from a dryer cylinder surface is introduced, said blade comprising a leading side and a front bevel surface to be impacted by the paper web, said leading side and said front bevel surface meeting at a contact edge to contact the dryer cylinder.

According to the invention, the front bevel surface shows a 3-D areal roughness—measured according to ISO 25178—of Sa>0.7 μm, and/or Sz>18 μm and/or Sq>1.0 μm.

In many realizations of such a blade, all roughness values will exceed the thresholds with roughness values of Sa>0.7 μm and Sq>1.0 μm and Sz>18 μm.

But for a blade according to aspects of the present invention, one or two of these roughness measurements may very well be below that threshold values.

In a preferred version, Sz is larger than 18 μm, especially 25 μm or larger.

The dryer cylinder may be a Yankee cylinder.

Referring to ASM (American Society of Materials) Handbook, Vol. 5 from 1994—Surface Engineering (P. 136 to 138), the topography of surfaces is defined by a combination of three specific features: the surface roughness, the surface waviness and the surface form.

As mentioned, the prior art is only concerned with the influence of macroscopic topography features like the waviness ("undulatory creping blade") and the surface form (e.g. "creping angle") on the paper properties.

If the microscale topography is considered in the prior art, the goal is to reduce the roughness as much as possible in order to reduce wear and abrasion.

The blade comprises a leading side which is directed towards the dryer cylinder and a trailing side which faces away from the dryer cylinder. The distance between the leading side and the trailing side defines the thickness (x-direction) of the blade. Usually, the blade thickness lies between 600 μm and 1500 μm. Leading side and trailing side are usually parallel, at least over a part of the width direction (y-direction) of the blade. The length of the blade (z-direction) usually extends over several meters and corresponds to the cross direction (CD) dimension of the dryer cylinder it is intended for.

It should be noted that especially the leading side of the blade can comprise several surfaces. If for example the main surface is in contact with a rotating dryer cylinder, a so-called sliding wear surface will be formed. In order to better accommodate to the sliding surface and for an easier blade engagement toward the dryer surface, a prebevel angle can be made at the blade tip during the creping blade manufacturing. The sliding wear surface as well as the prebevel are considered as a part of the leading side.

The front bevel surface is a part of the top side of the blade. The front bevel surface is the surface adjacent to the leading side extending in the thickness direction of the blade. When used as a creping blade, the paper web impacts this part of the blade, usually with a very high speed of e.g. 2000 m/min. While the top side of a creping blade may extend up to 1500 μm, only the first 150 μm from the blade contact point are usually impacted by the paper web and mostly affect the bulk of the paper.

From experience, the paper web impinges upon the front bevel surface at an average distance of 100 μm to 150 μm from the blade contact point in the x-direction. Therefore, the front bevel surface extends at least 150 μm from the blade contact point in the x-direction. In this area of 150 μm, the roughness requirements given above are absolutely necessary. In many cases it will be beneficial to extend the roughness more than 150 μm in x-direction. For example, a distance of at least 250 μm or at least 350 μm from the blade contact point may be provided with the favorable roughness. This can be beneficial to insure that even after a certain wear of the blade a sufficiently large front bevel surface with desired roughness is guaranteed.

In many applications, the full top side of blade, extending up to 1500 μm from the blade contact point, will be provided with the necessary roughness, since this can be easily achieved by standard measures like thermal spraying or sand blasting event though this is not necessary for the present invention. On the other hand, more sophisticated methods like laser engraving can be used to create the necessary roughness only on part of the top side of the blade.

The surprising observation on which the present invention is founded is that even the smallest feature of the surface topography of the front bevel surface can still be influence in the blade creping process, i.e., in the specific mechanism that creates the tissue structure. More specifically, it is found that the higher roughness of the creping blade surface that is impacted by the paper web—the front bevel surface—does modify the stress during the detachment of the paper web from the dryer cylinder and, as a result, more fibre bonds are broken and/or distorted. In any case, this leads to a different fibre structure arrangement. This finding was surprising since the general knowledge in the technical field was that the blade, especially the tip, should be as smooth as possible in order to reduce wear at the blade as well as at the dryer. The discovery of the applicants is that while this hold true for the areas contacting the cylinder, the front bevel surface should be made rather rough.

This principle of increasing the bulk by breaking/distorting fibre structures through the roughness of the front bevel surface is totally understandable. But in the first tests of the applicant the correlation between the measured roughness and the bulk increase was not very strong. After extensive experiments by the applicant another highly surprising discovery was made. The roughness measurements that are used as a standard do not reliably describe the surface roughness that affects the bulk of the paper!

In most cases, blades according to an aspect of this invention will be manufactured and sold with a front bevel surface that shows the desired roughness. But it is also possible that the new blades are outside the claimed roughness range at the time of installation, but reach the roughness after a certain run in period due to wear or special treatment. Both kinds of blades are covered by the present application.

It is known by skilled persons that between three and six roughness parameters are usually required to properly characterize a surface topography.

The industry standard are usually measurements according to the norm: ISO 4287: Geometrical Product Specifications (GPS)—Surface texture: Profile method—Terms, definitions and surface texture parameters.

This standard does support the two-dimensional (2-D) or line roughness measurements and provides the values:

Ra: Arithmetic mean deviation of the roughness profile (Amplitude parameter in micron)

Rz: Maximum height of the roughness profile (Amplitude parameter in micron)

Rq: Root-mean-square deviation of the roughness profile (Amplitude parameter in micron)

Rc: Mean height of the roughness profile elements (Amplitude parameter in micron)

Rt: Total height of the roughness profile (Amplitude parameter in micron)

Due to the 2-dimensional character of these values, they do not properly characterize the surface structure that effects the bulk of the paper (which may be called 'active roughness'). This will later be shown in more detail.

The applicant has found that the roughness measurements according to the norm ISO 25178: Geometrical product specifications (GPS)—Surface texture: Areal method—Metrological characteristics for areal topography measuring methods.

Is much more suited. This standard does support the three-dimensional (3-D) or areal roughness measurements and provides the values Sa: Arithmetic mean height (Height parameter in micron)

Sz: Maximum height (Height parameter in micron)

Sq: Root-mean-square height (Height parameter in micron)

To perform these measurements, a universal profilometer UP-24 (non-contact, fast 3-D measurement, line and area measurement techniques) from Rtec Instruments can be chosen. All 3-D roughness measurements shown in this application were performed on such instruments. Also the 2-D measurements have been performed on this instruments.

A non-contact measurement like with the UP-24 is preferable since it is important that the roughness values are determined with high accuracy. Contact measurements bear the danger that a stylus may not be able to penetrate a narrow pit to the same depth as a non-contact instrument thus leading to less correct measuring values.

The parameter settings for the profilometer are given in the following table:

| ISO 4287 Roughness (S-L) | ISO 25178 - Primary surface |
|---|---|
| F: None | F: None |
| S-Filter (λs): Gaussian, 2.5 μm | S-Filter (λs): None |
| L-Filter (λc): Gaussian, 0.08 mm | |
| Evaluation length: All λc (2) | |
| Amplitude parameters | Height parameters |

The experiments have shown that the 3-D surface value very accurately describe the 'active roughness'. For roughness values of Sa>0.7 μm and/or Sz>18 μm and/or Sq>1.0 μm, a significant impact on the bulk could be found.

In a preferred embodiment the roughness value may be in the following intervals:

Sa between 0.7 μm and 9 μm, especially between 2 μm and 6 μm and/or

Sz between 18 μm and 100 μm, especially between 25 μm and 70 μm and/or

Sq between 1.0 μm and 11 μm, especially between 2.5 μm and 7 μm.

It has been observed that while the bulk of the tissue product can be increased with higher roughness of the front bevel surface, other properties of the tissue product may deteriorate. As an example, pinholes in the product may appear, or the aesthetic appearance of the tissue surface—visible by eye—may deteriorate. For several tissue products, these properties may be irrelevant. But for other tissue products these properties can only be accepted to a certain degree. The intervals given above lead in many cases to a good compromise between the increase in bulk and a decrease in other properties.

The abovementioned roughness values can be created by periodic as well as non-periodic surface structures. In order to optimize the bulk by breaking/distorting fibre structures through the roughness of the front bevel surface, a non-periodic surface structure is usually preferable since a periodic structure might create a noticeable and disadvantageous effect on the Tissue paper.

One advantage of the present invention is the fact that it can be combined with a multitude of blade designs.

Therefore, the macroscopic shape of the front bevel surface can be for example flat or can have macroscopic topography, especially an undulatory topography.

The angle between the leading side and the front bevel surface is called the bevel angle β. The bevel angle may be set between 60° (negative front bevel surface) and 110° (positive front bevel surface), preferably between 70° and 95°.

While the top side of a creping blade may extend up to 1500 μm, the first 150 μm or 250 μm mostly affect the bulk of the paper. From experience, the paper web impinges upon the front bevel surface at an average distance of 100 μm to 150 μm from the blade contact point, in the x-direction. This surface is therefore critical to consider in the present invention. It may be possible that the roughness values of Sa>0.7 μm and/or Sz>18 μm and/or Sq>1.0 μm are only present at the first 150 μm or 250 μm of the top side of the blade since this is usually the technologically relevant front bevel surface. At a larger distance from the contact edge, e.g. 350 μm or 500 μm, different roughness values may be possible without a negative influence on the paper bulk.

In most applications the blade will comprise a steel strip (=steel blade).

Most appropriate steel strip references for this application are specified according to DIN EN 10132-4 standard. Steel normalized designation, chemical compositions and associated physical and mechanical properties are specified in the DIN EN 10132-4 standard. To reach the optimal elastic 'spring' properties, these steel strips are usually heat treated. As a result, these high-strength, hardened and tempered, high carbon steels usually have a hardness, as measured in Vickers (HV), in the range of 350 HV to 600 HV. While other alternative steels can be used, for example stainless steel references, hardness specifications will be similar.

Such steel blades may have a wear resistant material at the blade tip (coated & grinded).

It is also possible that the blades have a thermally sprayed coating e.g. of a ceramic based material. To protect the blade tip, most likely the active parts subjected to mechanical stress and wear, wear resistant deposits can be advantageously applied. Different deposit embodiments can be suitable in order to protect partially or totally the different areas at the blade tip. As a result, higher longevity and more stable working conditions are reached. Typical deposit types, for example those made of, or including, at least one metal oxide, at least one metal nitride or at least one metal carbide, can be advised for this application. More specifically, it has been found that carbide based materials and especially tungsten carbide based references are well suited to meet the invention requirement. Indeed, most of the carbides are really hard and advised for wear resistant purposes. Materials are usually in a composite form, made of a high portion of carbide particles homogeneously distributed in a matrix, namely a metallic matrix. This later compound acts as a binder, supporting the hard and brittle reinforcing phase. Cermet is the common denomination for such composite materials. Usually, the volume of the matrix or binder phase is less than 30% of the total volume of the cermet. Carbide size is one important criteria when selecting the cermet reference from supplier. While processing parameters will obviously have an influence on the final roughness of the deposit, it has been confirmed that, the higher the selected primary carbide particle size, the greater the resulting surface roughness. As an example, average carbide size, as used to manufacture some of the product according to the invention, were ranged from 0.5 μm to 15 μm. The processing technique to apply such cermets is thermal spraying and more specifically high velocity flame spraying. Typical resulting deposit hardness, as measured in Vickers (HV), and on the material cross-section, are ranged from 900 to 1700 HV. In many applications, the hardness of the deposit is two times to four times the hardness of the base steel substrate.

All these kinds of blades can be provided with a 3-D surface roughness of the front bevel surface according to one aspect of the current invention.

The working surfaces of the blades which are intended to be in contact with the Yankee surface, should be smooth and are usually finished to a targeted low roughness level. Typical roughness specifications are Ra<0.4 μm and Rz<4.0 μm. While the objective of the invention is to intentionally increase the 3D-roughness of front bevel surface, it is to be clear that the adjacent surface intended to be in contact with the Yankee dryer, must keep a surface roughness within the above 'smooth' specification range. Also much smoother contact surfaces with e.g. Ra<0.2 μm and/or Rz<2.0 μm are common.

The desired 3-D roughness of the front bevel surface can be achieved in many ways. In order to change the surface topography, for example with the intention to increase its roughness, potentially almost all manufacturing processes can be used. Surface alteration or surface modification principles will be involved. Such surface treatment processes may include a mechanical (e.g., machining, blasting), a chemical (etching, coating), a thermal (heat treatment, energy beam, coating, deposition) and/or an electrical (energy discharge) effect; with (e.g. coated or deposited layer) or without the addition of more material.

It is for example possible to apply a post process in the form of sand blasting to increase the roughness to the desired level. Alternatively, in cases where a thermally sprayed coating is applied, the process can be adapted to achieve the desired 3-D roughness. In this case, it can be possible to omit a post process.

According to the invention, it is not an obligation to have an isotropic properties or roughness characteristics. It is nevertheless often the case here as the selected post-treatments and manufacturing methods tend to promote this isotropy.

In paper machines, especially in tissue machines, the blades according to the invention will be used in form of creping arrangements in combination with a dryer cylinder, especially with a Yankee cylinder.

Here it may be beneficial that the contact angle α between the blade and the dryer cylinder is between 5° and 35°, preferably between 15° and 25°.

It is to be understood that during usage, the blade tip at the contact edge with the Yankee surface will develop a certain wear in line with this angle α. This will result in the creation of a sliding wear surface. To prevent damage on the Yankee surface, a low sliding wear angle should be preferred.

In order to better accommodate to the sliding surface and for an easier blade engagement toward the Yankee surface, a prebevel angle can be made at the blade tip during the creping blade manufacturing. Usually, the angle of the prebevel is smaller than the intended contact angle α. In preferred applications, the angle of the prebevel can be chosen below 15°, for example 2°, 5°, 8° or 10°.

Alternatively or in addition it may be beneficial if the pocket angle δ between the tangent to the dryer cylinder at the blade tip contact and the front bevel surface is between 115° and 35°, preferably between 95° and 65°, more preferably between 85° and 70°. (The pocket angle is sometimes also called cutting angle or creping angle).

While the bevel angle β is a design parameter of the blade, the pocket angle δ is the result of the bevel angle β and the contact angle α and determines the quality of the crepe structure. The angle δ is measured between the tangent to the Yankee surface at the blade tip contact edge, and the front bevel surface, aka the web impact surface, of the creping blade. On principle, increasing δ, by any decreasing action on α and/or β, leads to softness improvement while caliper decreases.

The following figures and examples shall further illustrate the present invention. The invention is not limited to these embodiments.

DETAILED DESCRIPTION OF THE INVENTION

Figure 1:
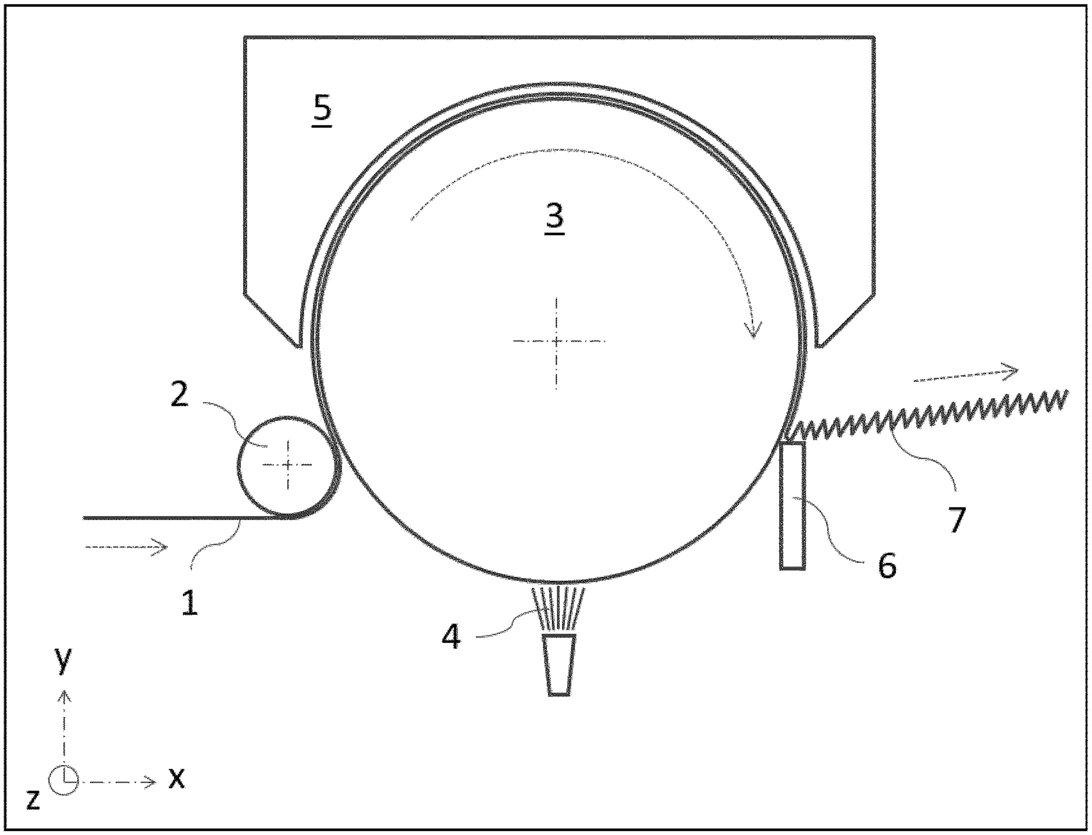
FIG. 1 is a schematic side view of a part of a tissue machine with a creping arrangement according to one aspect of the present invention.

At the beginning of the process of manufacturing tissue paper, the stock or furnish, i.e., the highly diluted slurry of pulped wood fibres, is supplied by the headbox into the tissue machine and distributed evenly along the entire width of the machine in the gap between two rolls. On one roll there is a wire, i.e., a screen cloth, and on the other a felt, i.e., a thick textile. The wet web 1 attaches to the felt and follows it on into the machine at a high travelling speed. Dewatering happens prior to reaching a suction press roll 2 and dryer cylinder 3 in the form of a large Yankee dryer 3. The Yankee dryer 3 size can be defined by its diameter of around 5 m (and up to 7.3 m) and its length (in cross machine direction CD) of around 5.5 m (and up to 7.8 m). Its length being slightly wider than the paper sheet 1 width. Coating chemicals may be sprayed by a series of nozzles 4 to promote the adhesion between the sheet 1 and the Yankee dyer 3, and to protect the metallic surface of the cylinder 3. The drying process is performed by the steam-heated Yankee cylinder 3 and by hot air flow from the hood 5. The lightweight sheet of fibres moves at a speed rate up to 2,400 m/min, impact the front bevel surface 10 of the creping blade 6 and gets scraped off the Yankee 3 surface. The creping blade 6 size can be defined by its length (up to 7.8 m, as measured in the z-direction or CD direction), its width (between 50 and 150 mm, as measured in the y-direction) and its thickness (between 0.6 and 1.5 mm, as measured in the x-direction). The creped structure of the tissue paper 7 is then created. At the end of the process, the finished tissue paper 7 is rolled up onto large jumbo reels at a lower speed compared to the Yankee 3.

Figure 1A:
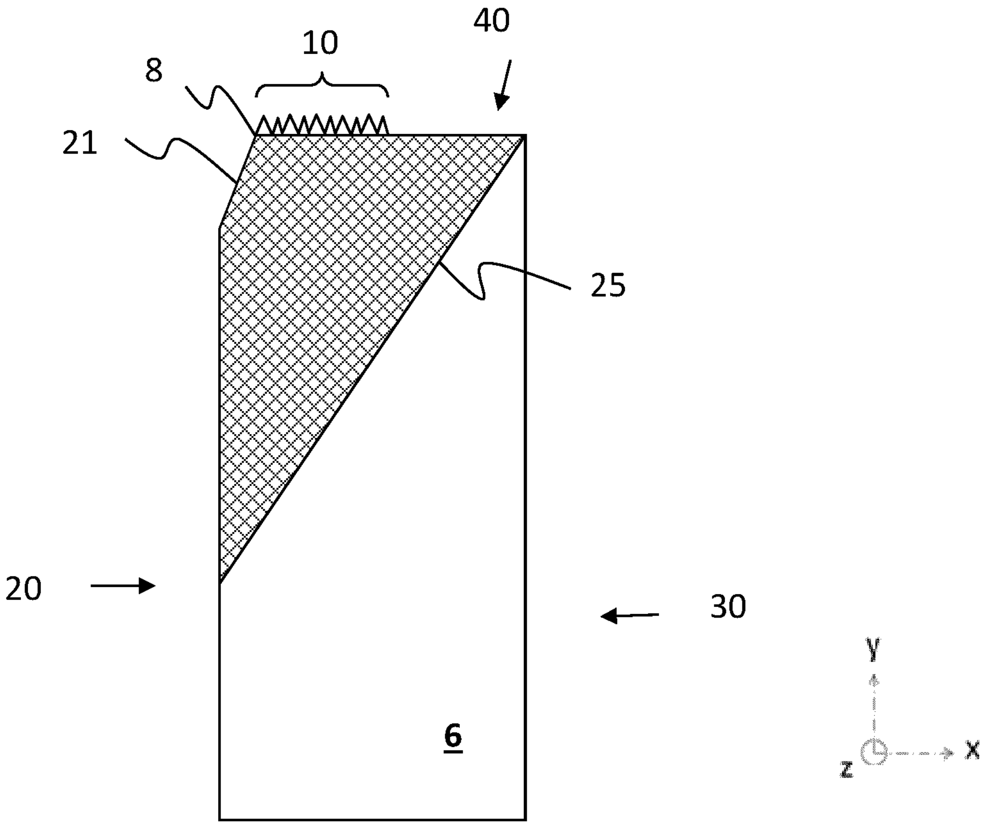
FIG. 1*a* is a schematic view of a blade according to one aspect of the invention
Figures 2A, 2B:
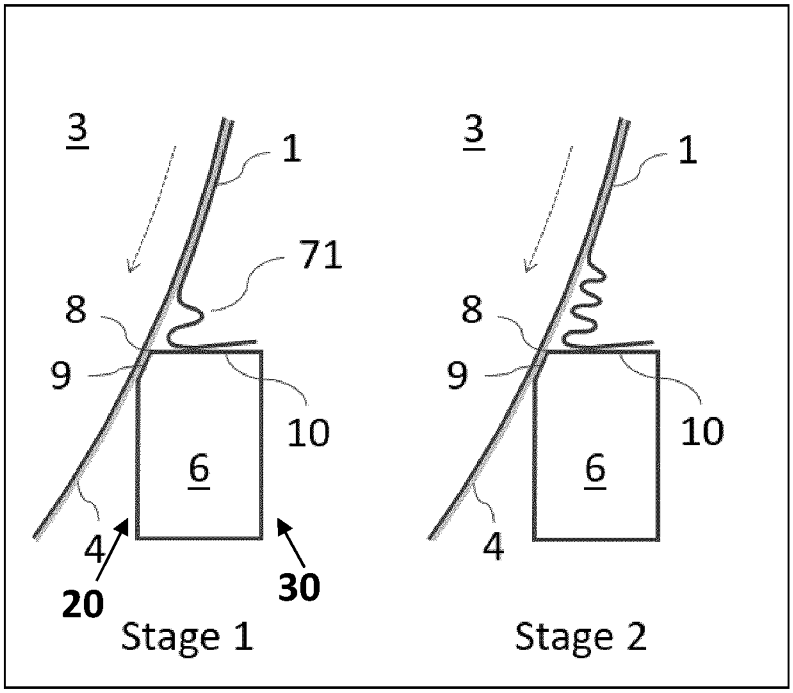
FIG. 2*a* to 2*d* are cross-sectional schematic views of the crepe development principle, illustrating the 4-stage of creping from micro to macrofold formation.
Figures 2C, 2D:
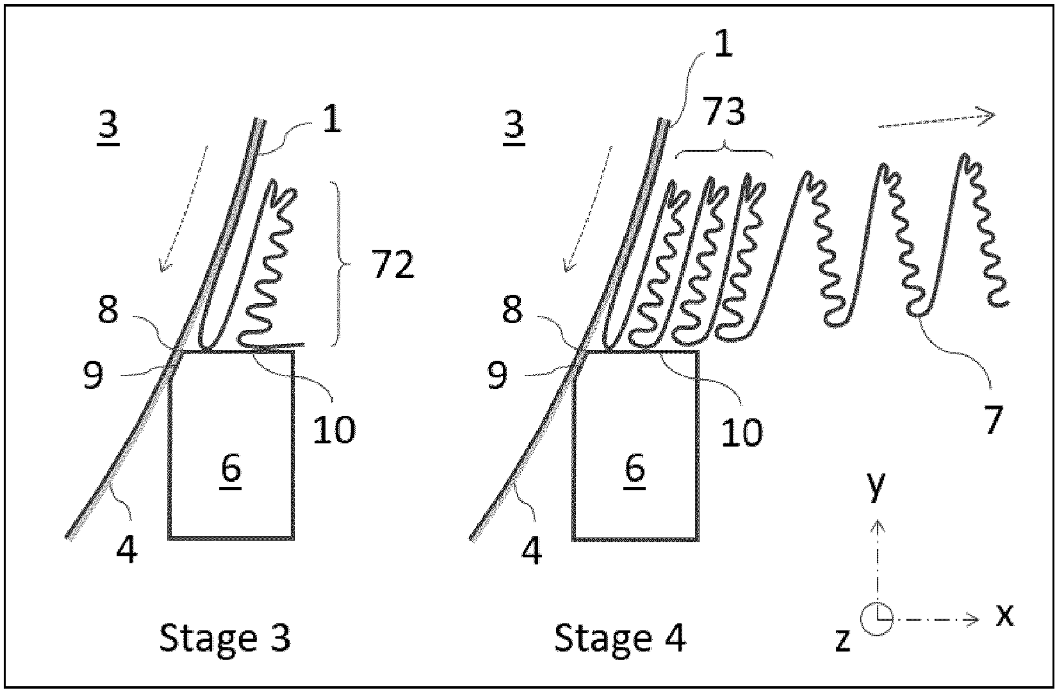

FIG. 1*a* shows a typical blade 6 according to one aspect of the invention, comprising a leading side 20, a trailing side 30 and a top side 40. The leading side 20 is widely parallel to the trailing side 30, except for the surface of the prebevel 21. The blade 6 is a steel blade 6 with a wear resistant coating 25 applied to it. Here, the coating 25 covers all of the top side 40 and parts of the leading side 20. Depending on the application, other areas of the blade 6 may be covered with a wear resistant coating 25, for example only parts of the top surface 40 may be coated with a wear resistant coating 25.

One purpose of these coatings 25 can be to increase the hardness. While the typical steel used as base substrate has a Vickers hardness between 350 HV and 600 HV, the resulting coating 25 hardness can be ranged from 900 HV to 1700 HV. Usually, the hardness of the deposit 25 is two times to four times the hardness of the base steel substrate.

The front bevel surface 10 is on the top side 40 of the blade and extends from the contact edge 8 in x-direction. The front bevel surface 10 extends at least 150 μm, preferably 250 μm or more in x-direction. According to the invention at the front bevel surface 10, the roughness is comparably high, namely Sa>0.7 μm, and/or Sz>18 μm and/or Sq>1.0 μm.

Other parts of the blade 6, namely the prebevel 21 or other parts of the leading side 20 should be smooth. These faces of the blade may have a roughness Ra<0.4 μm and Rz<4.0 μm.

FIGS. 2*a*-2*d* describe a close examination of the creping mechanism and reveals the 4-stage process involving the development of microfolds 71 which become grouped into larger macrofolds 73 by the action of the doctor blade 6.

Creping delaminates the internal physical structure of the paper web 1, forcing the fibre bonds to be weakened or broken, and forcing the fibres to buckle, become distorted or even broken. Microfolds 71 are created (Stage 1) and piled up on top of each other (Stage 2), and when the pile 72 is high enough (Stage 3), the macrofold 73 falls and creates a macrofolded and structured end product 7 (Stage 4). The delamination process tends to produce a thicker, more absorbent, and cushiony tissue product with higher water-holding capacity than does the folding type of creping. Creping is a complex interaction of many factors. Managing its process is crucial to produce tissue 7 with high bulk, absorbency, softness, and stretch.

Figure 3:
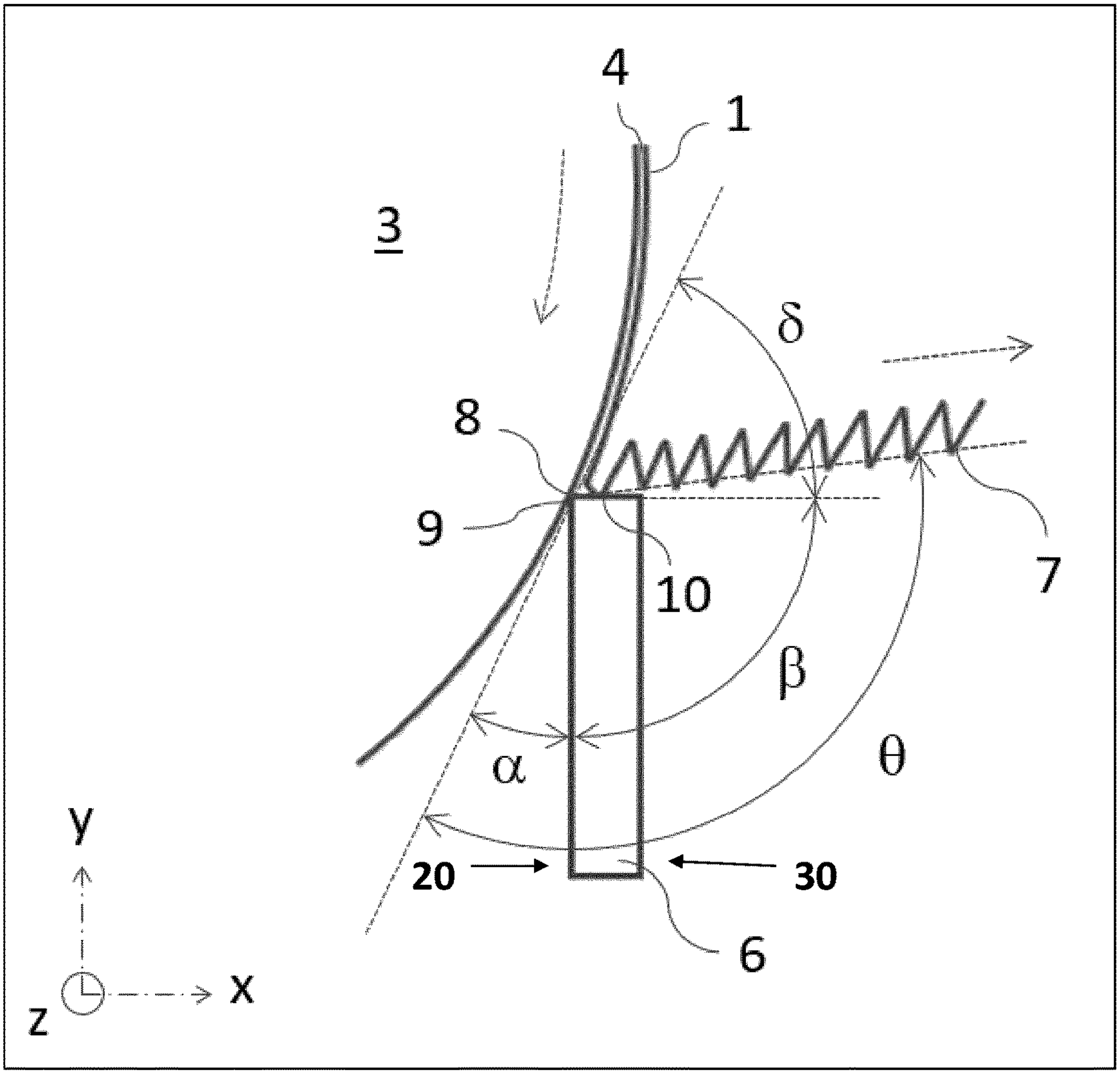
FIG. 3 shows a part of a creping arrangement with a creping blade according to another aspect of the present invention.

FIG. 3 illustrates the various angles used to define the geometrical situation at the blade 6 tip in the application. The blade 6 comprises a leading side 20 which is directed towards the Yankee cylinder 3 and a trailing side 30 which faces away from the Yankee 3. The sliding wear angle α is the contact angle between the Yankee dryer 3 and the creping blade 6. It is directly related to the blade holder angle and the elastic deflection of the blade 6 under a given load condition. Typical values for a are ranged from 5° to 35°, usually around 19°. It is to be understood that during usage, the blade tip at the contact edge 8 with the Yankee 3 surface will develop a certain wear in line with this angle α. This will result in the sliding wear surface 9. In order to better accommodate to the sliding surface and for an easier blade engagement toward the Yankee 3 surface, a prebevel 21 angle can be made at the blade tip during the creping blade manufacturing. Such a prebevel 21 angle can be chosen for example between 5° and 10°. Usually, this prebevel 21 angle is smaller than the sliding wear angle α. To prevent damage on the Yankee 3 surface, a low sliding wear angle should be preferred. The bevel angle β is a design parameter of the blade 6. Typical values for β are ranged from 60° (negative front bevel surface) to 110° (positive front bevel surface). The result angle δ, aka the creping or pocket angle, is important for the quality of the crepe structure. The angle δ is measured between the tangent to the Yankee surface 3 at the blade tip contact 8, and the front bevel surface 10, aka the web impact surface, of the creping blade 6.

On principle, increasing δ, by any decreasing action on α and/or β, leads to softness improvement while caliper decreases. Important to note that, from experience, the paper web 1 impinges upon the front bevel surface 10 at an average distance of 100 μm to 150 μm from the blade contact point 8, in the x-direction. This surface which extends up to around 250 μm from the blade contact point 8 in most of the cases, is therefore critical to consider in the present invention. Finally, the take-off angle θ is a direct function of the position of the rewinder as well as the web tension. The standard geometries can be chosen to adapt the creping pocket and to get the right creping quality.

Figure 4:
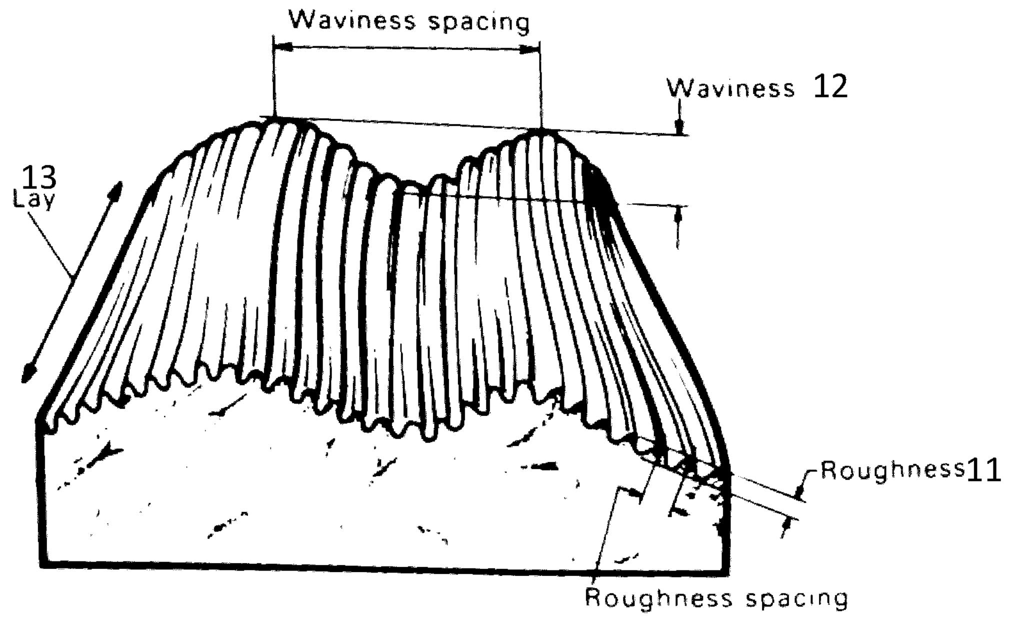
Fig. 4 (prior art)
FIG. 4 shows a generic figure from prior art (American Society of Materials Handbook, Vol. 5, 1994—Surface Engineering, page 136).

The interaction between the paper web 1 and the front bevel surface 10 plays a major role in the creation of the creped structure and the final tissue 7 properties. It is therefore important to focus on this surface 10 and better define its characteristics. It is known to a skilled person, e.g. from the ASM Handbook technical definition that most surfaces have regular and irregular spacings that tend to form a pattern or texture on the surface. Based on the generic FIG. 4 taken from this source, the resulting topography of surfaces is defined by a combination of three specific features:

- The surface roughness 11, i.e., the high frequency irregularities on the surface caused by the interaction of the material microstructure and the surface preparation,
- The surface waviness 12, i.e., the medium frequency irregularities on the surface on which the surface roughness is superimposed,
- The surface form, i.e., the general shape of the surface e.g., flat, rounded etc, neglecting roughness and waviness.

The lay 13 is another important feature of a surface. This is a machining pattern that has a distinctly directional characteristic. The lay is an important consideration because surface topography measurements will differ depending on the direction from which they are taken. It is a reason why we will promote the roughness measurement of a surface defined as an area. In particular, this will be applied to characterize the topography of the critical front bevel surface 10; especially in the specific area close to the blade contact point 8 where the paper web impact occurs.

Example 1

The following example underlines the importance of the 3-D roughness measurement in order to properly characterize the 'active roughness' of the front bevel surface 10.

Three different base substrates were chosen:

- S1—Standard steel substrate
- S2—Steel substrate with a wear resistant material at the blade tip (coated & grinded)
- S3—Steel substrate with a plurality of notches at the blade tip (undulatory blade)

Two specific surface treatments were used separately or in combination to change the texture of the specific front bevel surface 10 of the blade 6. It is important to mention that the surface of the leading side 20, which is adjacent to the front bevel surface 10, and in contact with the Yankee dryer 3 in the area linked to 8, must not be roughened. It is recommended to keep this contact surface, that may develop during use to become said sliding wear surface 9, as smooth as possible, in order not to damage (e.g. scratching) the Yankee dryer surface 3. Typical roughness specifications for these contact surfaces are Ra<0.4 μm and Rz<4.0 μm.

T1—Thermally sprayed coating of a ceramic based material (as-sprayed, no surface finishing/no grinding or polishing)

T2—Sand blasting of angular alumina particles (Size: F180, 1 spray nozzle, distance 50 mm, pressure 4 bars)

Based on these three substrates S1-S3 and the two surface treatment processes T1 & T2, a series of 15 blade samples, labelled from A to O, were manufactured according to standard methods (i.e. the base structure being supplied or made according to prior arts). While blade samples A, B, C and D were kept as references from 100% prior arts, all the others had one (sample E, N and O) or two (sample F to M) additional and subsequent surface treatment(s) to meet the invention requirements. Post-treated blade samples E to O were intended to be gradually processed so that the resulting roughness of the front bevel surface 10 increases. While blade samples M, N and O are expected to be the roughest from the series, it cannot be stated that resulting roughness values are the maximum to set upper limits for the present invention.

The following table provides the main manufacturing process steps and parameters to make the reference blade samples and the ones according to the invention. Note that, in case of several process steps involved, the chronology is always from top to bottom of this table. While the whole top side 40 of samples E to O were post-treated, it is important to remember that front bevel surface 10 could be limited to around 150 μm or 250 μm (0.25 mm) from the blade contact point 8 since this is where the paper web 1 impinges upon the front bevel surface 10.

TABLE 1

| Blade samples | | | | | | | | | | | | | | | |
|---|---|---|---|---|---|---|---|---|---|---|---|---|---|---|---|
| Label# | A | B | C | D | E | F | G | H | I | J | K | L | M | N | O |
| Base substrate | S1 | S2 | S2 | S2 | S2 | S1 | S1 | S1 | S3 | S3 | S3 | S3 | S3 | S1 | S1 |
| T1 - Thermal spray | | | | | | x | x | x | x | x | x | x | x | x | x |
| T2 Sand blasting | | | | | x | x | x | x | x | x | x | x | x | x | |

For these 15 samples, roughness values for the front bevel surface were measured in three ways: 2D in transversal direction (ISO 4287), 2D in longitudinal direction (ISO 4287) and 3D (ISO 25178). The results are given in the following table (all values in μm)

TABLE 2

| Roughness values | | | | | | | | | | | | | | | |
|---|---|---|---|---|---|---|---|---|---|---|---|---|---|---|---|
| Label# | A | B | C | D | E | F | G | H | I | J | K | L | M | N | O |
| 2-D line roughness measurement- Transversal profile- ISO 4287 | | | | | | | | | | | | | | | |
| Ra/T | 0.08 | 0.16 | 0.24 | 0.22 | 0.77 | 1.86 | 0.71 | 0.95 | 1.24 | 1.04 | 0.87 | 0.95 | 1.11 | 1.03 | 1.38 |
| Rz/T | 0.64 | 1.61 | 1.51 | 1.93 | 3.83 | 9.87 | 3.99 | 6.54 | 7.53 | 7 | 3.91 | 5.49 | 7.89 | 6.69 | 7.78 |
| Rq/T | 0.1 | 0.25 | 0.32 | 0.29 | 0.91 | 2.27 | 0.89 | 1.26 | 1.56 | 1.4 | 1.02 | 1.16 | 1.44 | 1.29 | 1.69 |
| Rc/T | 0.24 | 0.62 | 0.78 | 0.66 | 2.47 | 5.75 | 2.77 | 2.93 | 5.645 | 3.64 | 2.73 | 2.56 | 2.92 | 3.3 | 5.26 |
| Rt/T | 0.75 | 2.51 | 1.66 | 2.75 | 4.18 | 10.69 | 5.19 | 8.71 | 11.08 | 8.38 | 4.63 | 7.16 | 9.31 | 7.97 | 9.04 |
| 2-D line roughness measurement- Longitudinal profile- ISO 4287 | | | | | | | | | | | | | | | |
| Ra/L | 0.07 | 0.16 | 0.23 | 0.2 | 0.76 | 1.84 | 0.7 | 0.93 | 1.22 | 1.01 | 0.86 | 0.93 | 1.08 | 0.98 | 1.36 |
| Rz/L | 0.48 | 1.47 | 1.42 | 1.34 | 3.48 | 9.54 | 3.73 | 6.2 | 7.06 | 6.43 | 3.69 | 5.14 | 6.86 | 5.76 | 7.18 |
| Rq/L | 0.09 | 0.24 | 0.31 | 0.25 | 0.89 | 2.25 | 0.87 | 1.22 | 1.52 | 1.35 | 1 | 1.14 | 1.39 | 1.22 | 1.64 |
| Rc/L | 0.23 | 0.58 | 0.71 | 0.78 | 2.96 | 7.31 | 2.68 | 2.92 | 6.37 | 4.68 | 2.71 | 2.99 | 2.72 | 3.21 | 4.67 |
| Rt/L | 0.54 | 2.31 | 1.55 | 1.82 | 3.81 | 10.48 | 5.05 | 8.24 | 10.53 | 7.55 | 4.27 | 6.78 | 7.84 | 6.8 | 8.64 |
| 3-D areal roughness measurement- surface of 200x200microns- ISO 25178 | | | | | | | | | | | | | | | |
| Sa | 0.12 | 0.19 | 0.29 | 0.28 | 1.05 | 2.92 | 2.84 | 3.11 | 2.05 | 2.83 | 3.73 | 3.22 | 6.11 | 3.62 | 3.48 |
| Sz | 2.19 | 10.88 | 14.07 | 9.57 | 25.41 | 21.47 | 28.6 | 37 | 35.48 | 43.71 | 29.05 | 40.28 | 56.76 | 66.38 | 46.82 |
| Sq | 0.15 | 0.26 | 0.66 | 0.43 | 1.43 | 3.63 | 3.77 | 3.84 | 2.60 | 3.65 | 4.48 | 3.93 | 7.61 | 4.94 | 4.57 |

Figure 5:
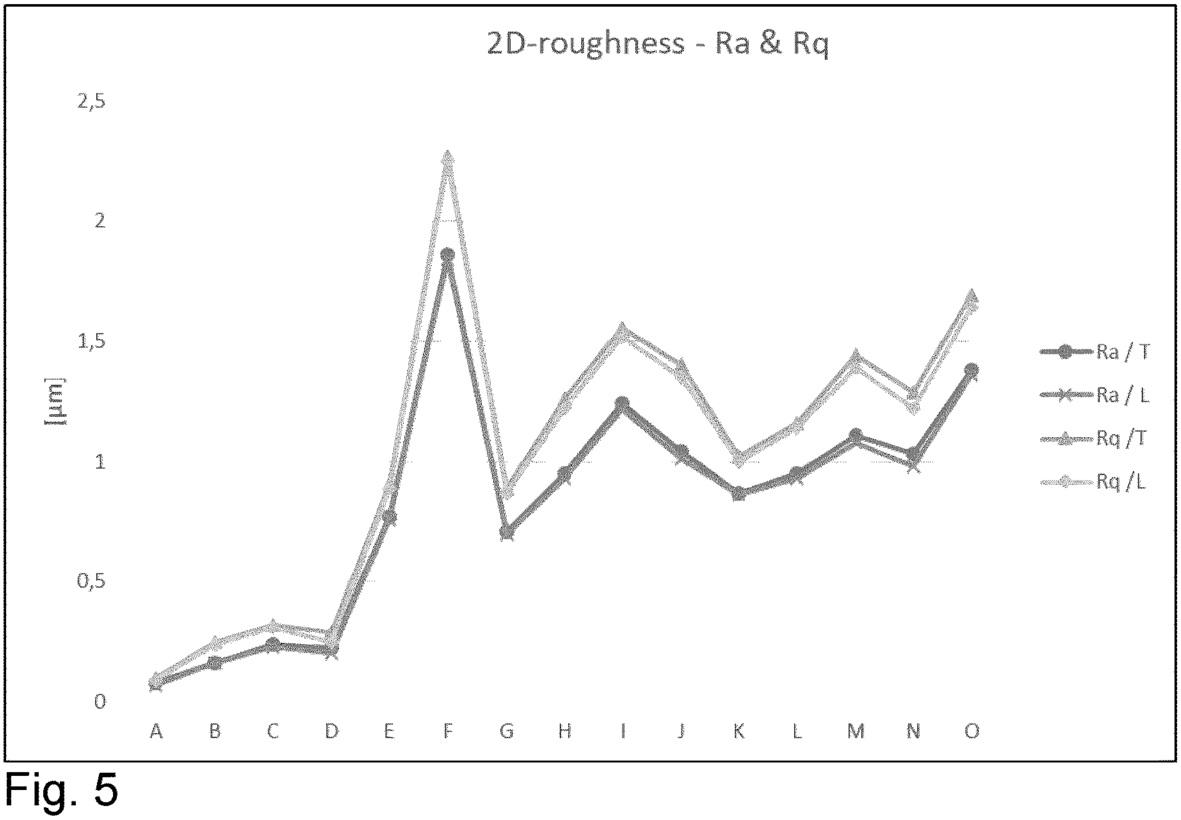
FIG. 5 and FIG. 6 are graphic of 2-D roughness values.
Figure 6:
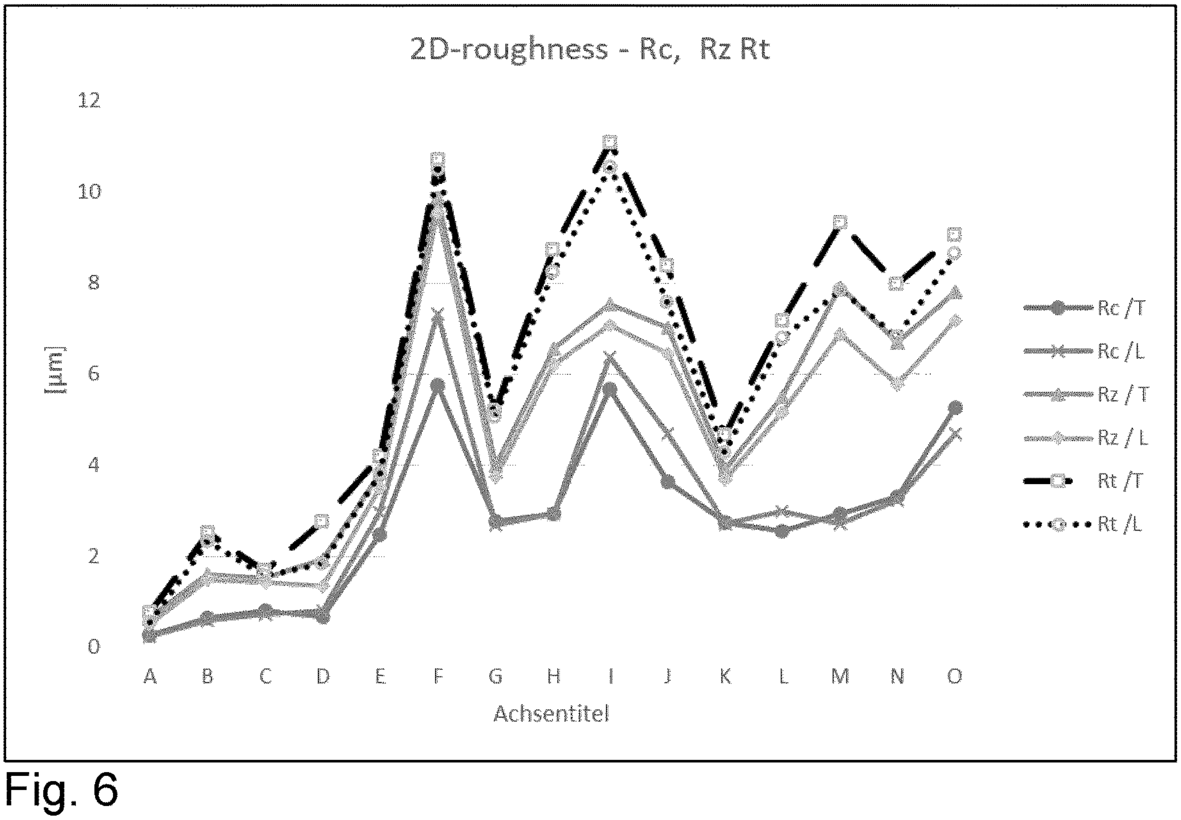
Figure 7:
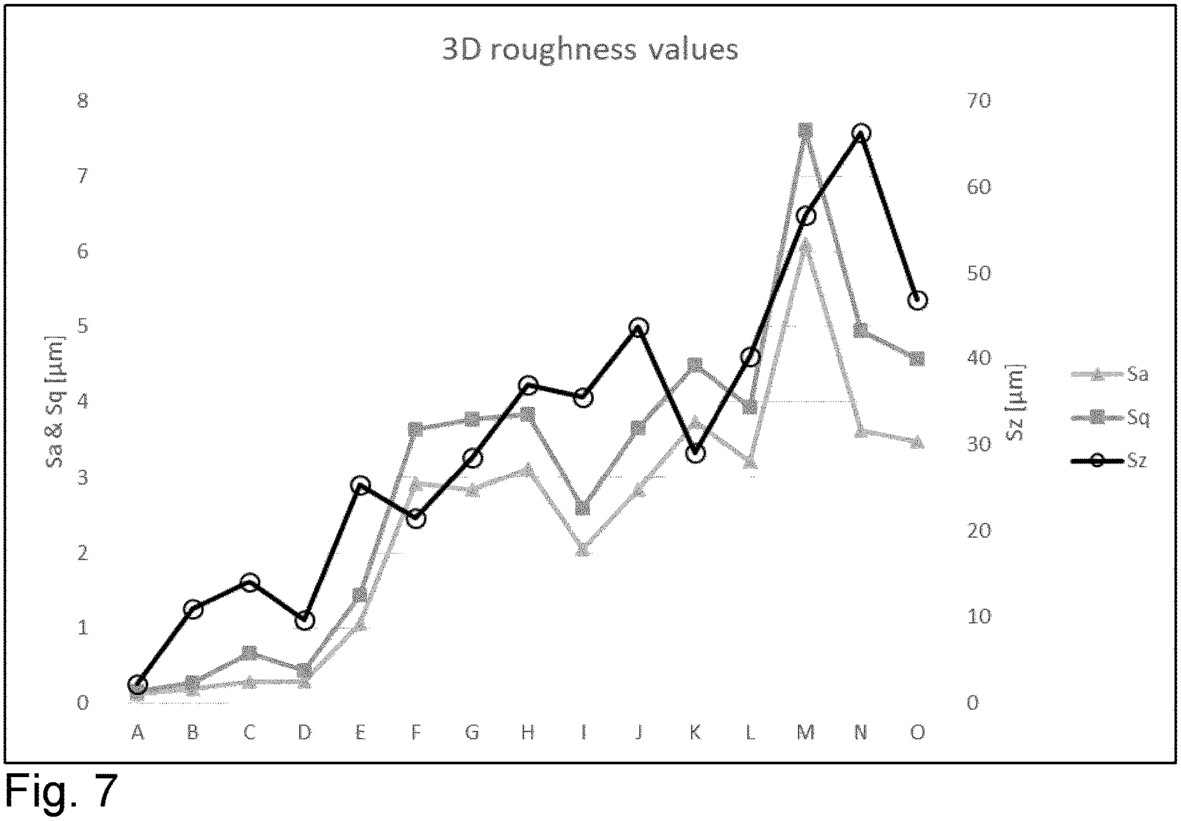
FIG. 7 is a graphic of 3-D roughness values.

FIGS. 5 to 7 illustrate the evolution of above roughness parameters for each blade samples (A to O) for an easier relationship representation. On FIG. 5 and FIG. 6, one can see that the longitudinal and transversal roughness values are pretty much aligned. This confirms the homogeneity of the surface texture in the two main directions, aka the machine direction (MD) and cross direction (CD).

According to the invention, it is not an obligation to have an isotropic properties or roughness characteristics in those directions. It is nevertheless the case here as the selected post-treatments and manufacturing methods tend to promote this isotropy.

When comparing these graphs to the last graphs in FIG. 7, the trends of the 3-D areal roughness measurements are less disturbed with a more constant evolution for post-treated blade samples E to O. Remember that initial goal was to gradually increase the roughness of the front bevel surface 10. In any case, the 3-D areal roughness measurements give obviously a better representation of the global surface roughness characteristics. This is a reason why the three related roughness parameters Sa, and/or Sz and/or Sq will only be considered for the roughness specifications according to the invention. As compared to reference blade sample A to D, the enhanced surface roughness for the blade samples according to the invention are characterized by the following specifications: Sa>0.7 μm and Sz>18 μm and Sq>1.0 μm. While in these examples all three of these roughness parameters show more or less the same tendency from sample to sample, this does not have to be the case. It can also be, that one sample has for example quite low values for Sa and Sq (e.g around 1.3 μm, 1 μm or even less) while having a relatively high Sz value (e.g., 30 μm or 40 μm). This would still give a beneficial blade.

Figure 8A:
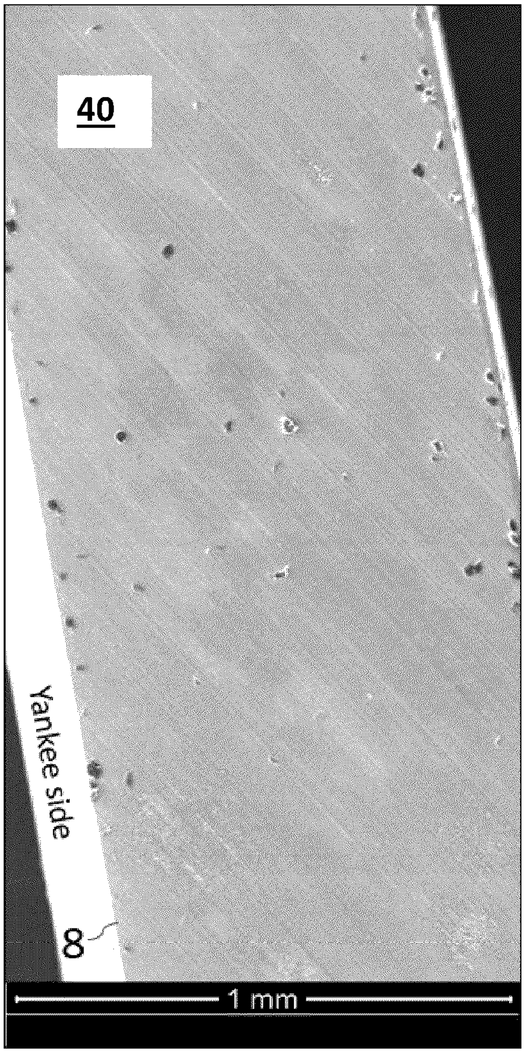
Fig. 8a (prior art)
FIG. 8*a* shows an SEM picture of a front bevel surface of the prior art.
Figure 8B:
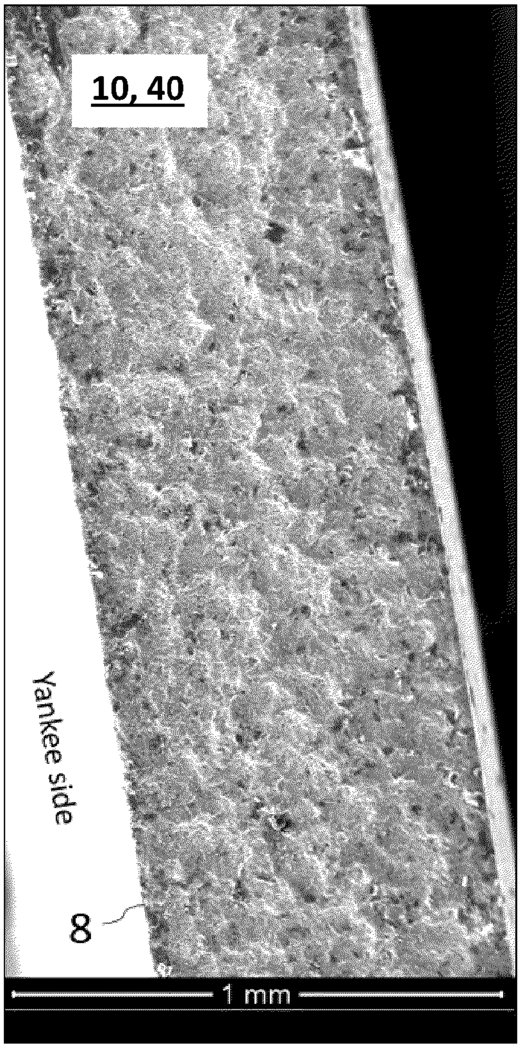
FIG. 8*b* shows an SEM picture of a front bevel surface according to one aspect of the invention.
Figure 9A:
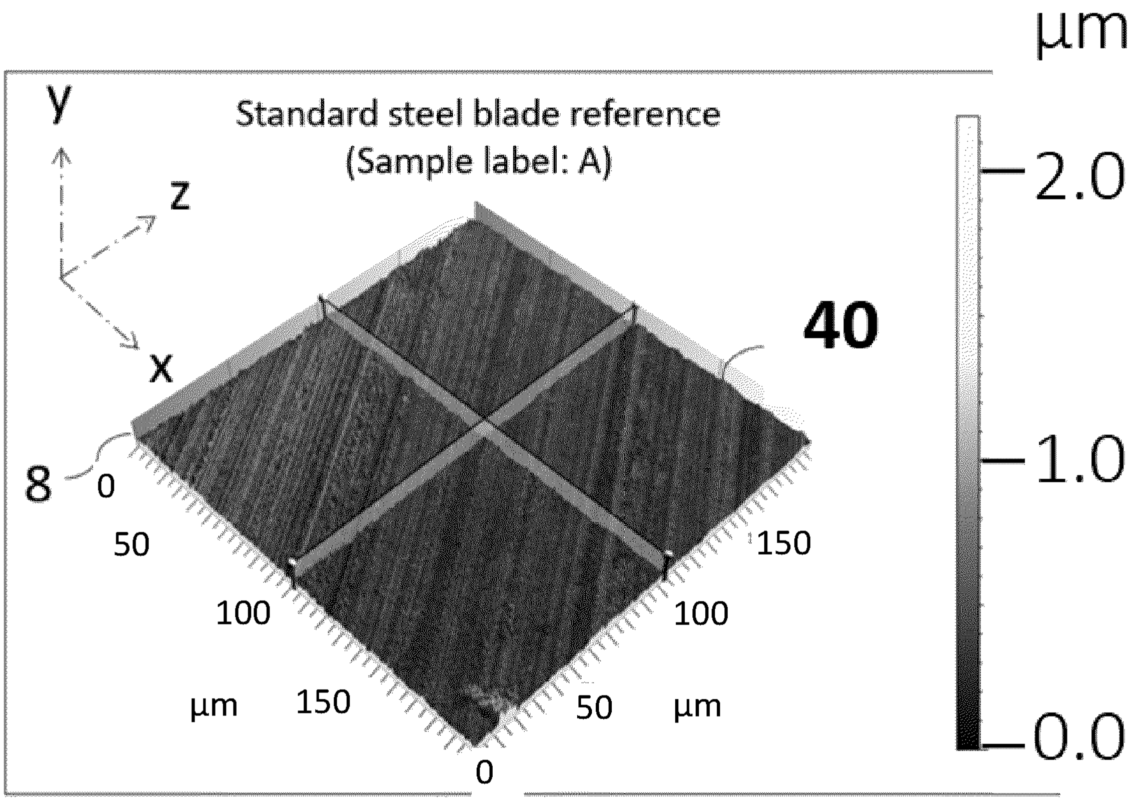
Fig. 9a (prior art)
FIG. 9*a* shows the topography of a front bevel surface of the prior art.
Figure 9B:
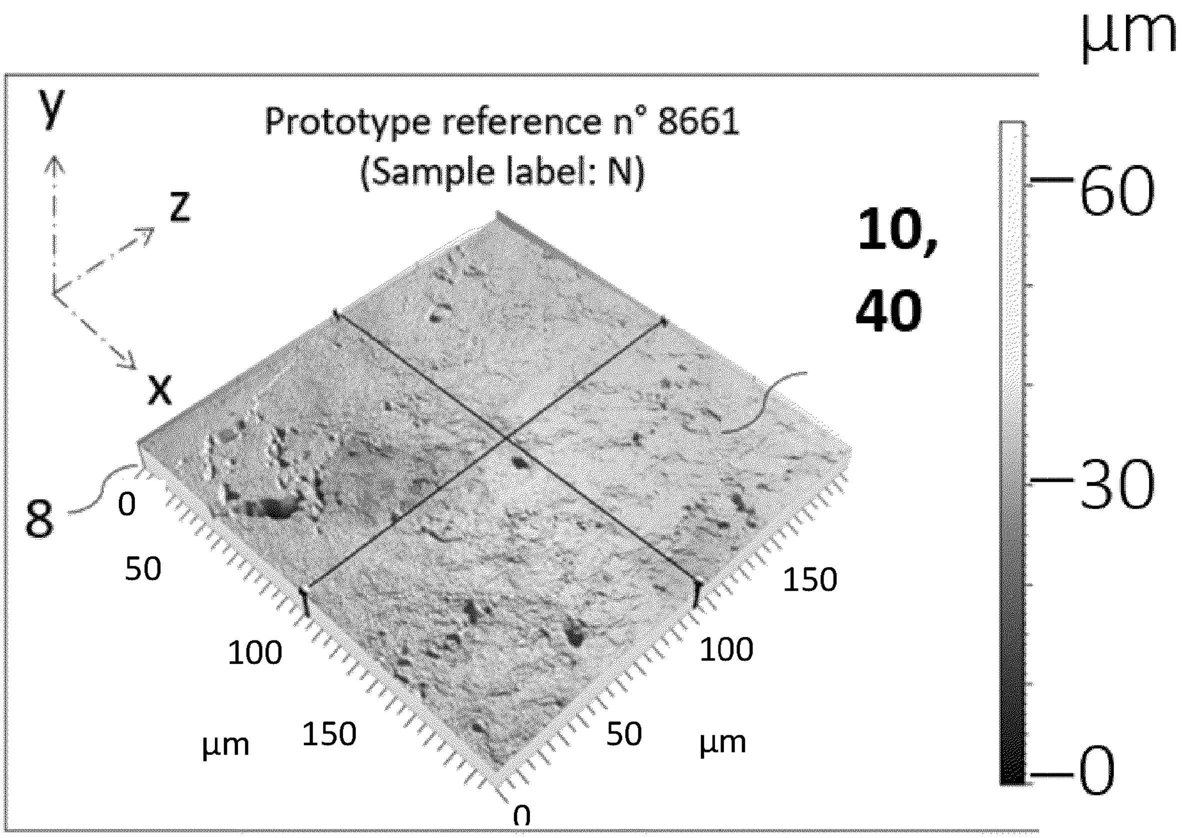
FIG. 9*b* shows the topography of a front bevel surface according to one aspect of the invention.

In order to give a visual impression of a surface structure according to an aspect of the present inventions, FIG. 8*a* and FIG. 8*b* show electron microscope (SEM) pictures of two different top side 40 surfaces. FIG. 8*a* is taken from Sample A, which is a standard steels substrate from the prior art, while FIG. 8*b* is taken from Sample N, which is the same base substrate but treated with thermal spraying and sand blasting. Accordingly, FIG. 9*a* shows a topography measurement of the blade of FIG. 8*a*, and FIG. 9*b* shows a topography measurement of the blade of FIG. 8*b*.

TABLE 3

| Comparison | | |
|---|---|---|
| | Sample A | Sample N |
| Sa | 0.12 | 3.62 |
| Sz | 2.19 | 66.38 |
| Sq | 0.15 | 4.94 |
| Topographical height | 2 μm | 60 μm |

The difference of both blades is clearly visible. Sample A in FIG. 8*a* has a smooth and shiny top side 40 surface. The diagonally oriented lines are caused by a grinding process, corresponding to the lay 13. Apart from these lines and occasional, small, point-shaped disturbances, the surface is very smooth and flat.

Sample N in FIG. 8*b* in contrast shows a very rough and jagged surface. There is no shiny impression at all. In this example, the structure looks isotropic, showing no preferred direction. Figuratively speaking, the blade according to the prior art looks like a sandy beach, while the blade according to one aspect of the invention rather looks like a birds eye view of an alpine mountain region. In FIG. 8*b* the front bevel surface 10 extends over the whole top side 40 of the blade.

The topography measurements form FIGS. 9*a* and 9*b* underline the visual impression. Here again the x-direction is the thickness direction of the blade 6 while the z-direction is parallel to the Yankee 3 surface. While the topographical height—the difference between the deepest valley and the highest tip—in for sample A is around 2 μm, the value for sample N is around 60 μm. The height of sample N is therefore about 30 times larger than the height of sample A. This corresponds very well with the Sa/Sz/Sq values. Each of these three roughness measures are about 30 times higher for Sample N than for sample A. This again underlines the fact these values are best suited to characterize the front bevel surfaces for blades in the framework of this invention.

In order to evaluate the performance of the creping blade according to the invention (Prototype reference—Pr n°) as compared to the ones from prior arts (Standard reference—Sr n°), several comparative trials in real conditions were performed. These creping blades will be manufacture in accordance with the samples presented on the Example 1.

While the prototype or standard reference n° are linked to internal manufacturing n°, the correspondence with the sample labels will be given. The following two examples present the results from trials at tissue mills producing different types of creped paper.

Example 2

A first trial was conducted under the below running conditions and settings:

Paper web made from 100% virgin fibres

Handkerchief/Facial tissue grade

Tissue basis weight of 10.5 to 11 g/m2

Tissue base thickness (dry) of 42 μm

Metallized Yankee dryer surface

Yankee dryer speed of 1650 m/min

Coating chemicals amount of 5.9 mg/m2

Creping blade dimensions of 1.0×120×5850 mm (thickness×width×length)

Bevel angle β of 75° (−15° negative front bevel surface)

Sliding angle α of 21°

Pocket angle δ of 84°

The objective of the trial was to increase the thickness of the tissue paper, hence the tissue bulk, in order to have gain in a subsequent process step in converting. Indeed, it is of an economic benefit to sell less product (higher thickness and therefore more air) for the same price. As known to a skilled person, fiber costs are by far the highest costs in papermaking and may amount to 50% of all production costs. Therefore, even a relatively small saving in fiber consumption of e.g. 1 or 2 percent can significantly increase the profitability of the production.

As a critical requirement, especially in the case of facial tissue and handkerchief product, the smooth softness must not be compromised at all.

The following 3 blades were tested during the mentioned relevant production time (hours):

Sample label B=Sr 6835 (27 h) as the reference vs.

Sample label E=Pr 8614 (22 h) and

Sample label N=Pr 8661 (22 h).

Positive results were achieved according to the customer. The improvements were measured based on the tissue paper dry thickness increase over time as compared to the reference, and summarized as below:

Tissue Base Thickness:

42 μm for the reference blade Sr 6835 (B)

+1.5 to +2.5% for the innovative blade Pr 8614 (E)

+3.0 to +4.0% for the innovative blade Pr 8661 (N)

Interestingly, it was noticed that tissue surface looks more homogenous with less marking in the cross direction (CD); aka creping bars. This is explained as direct effect of the surface texture and the higher roughness that scatters the fibres in more directions. As a result, the fibre distribution is more even at the tissue surface.

As presented in the definition, the bulk is dependent on the tissue paper basis weight. Taking this into consideration, it was stated that the maximum bulk increase in the specific above tissue application, is expected to be 10% using an optimized creping blade according to the invention.

Example 3

In a second trial, it was decided to target an application where bulk increase is the primary goal. Below running conditions and settings were used:

- Paper web made from 100% virgin fibres
- Kitchen towel/Absorbent tissue grade
- Tissue basis weight of 19 to 20 g/m2
- Tissue base thickness (dry) of 110 μm
- Metallized Yankee dryer surface—Yankee dryer speed of 1600 m/min
- Creping blade dimensions of 1.2×105×3200 mm (thickness×width×length)
- Bevel angle β of 90° (Squared front bevel surface)
- Sliding angle α of 16° to 21° (Values cannot be measured more accurately as the production time was limited to only around one hour)
- Pocket angle δ of 69° to 74°

The objective of the trial was to increase the tissue paper bulk and its absorbency. Indeed, these tissue quality aspects are critical in the case of kitchen towel. While tissue softness is of least importance, tissue paper stretch as measured in the machine direction (MD) and cross direction (CD) will be considered.

The following 3 blades were tested during the mentioned limited production time (hours):

Sample label A=Steel blade as the reference

Sample label I=Pr 9401 (1.2 h) and

Sample label K=Pr 9426 (1.2 h)

Note that the current steel blade has no reference as it is not a product supplied by the inventor. Having said that, it is the most common and basic creping blade type, well know from skilled persons. Main disadvantages are linked to low lifetime, limited creping process stability, and variable tissue paper quality.

Preliminary satisfactory results were achieved according to the customer. The improvements and other relevant results were measured based on various tissue quality parameters, and summarized as below:

Dry Tissue Base Thickness:

110 μm for the steel blade reference

+5% for the innovative blade Pr 9401 (I)

+25% to +30% for the innovative blade Pr 9426 (K)

Bulk:

5.7 cm3/g for the steel blade reference

+5% for the innovative blade Pr 9401 (I)

+20 to +25% for the innovative blade Pr 9426 (K)

The really good results achieved when using the creping blade Pr 9426 was relativized as, obviously visible by eye, the tissue surface had a strong squared pattern. This aspect is characterized by marking on the tissue surface in both, the cross direction (CD) and in the machine direction (MD). While this can be acceptable for some applications, this may not be acceptable form a tissue quality or aesthetic standpoint depending on the type of tissue, its final purpose and/or further customer acceptance. This is a major drawback of blades provided with notches on the front bevel surface, especially if the waviness depth and size of the notches are relevant. The notches which are spaced from around 1 mm, are big enough to expect a mechanical deformation or embossing of the paper web when impacting the surface during creping.

Other tissue grades such as toilet paper may be also made with blades according to the invention.

REFERENCE SIGNS

1 paper web
2 suction press roll
3 dryer cylinder, Yankee
4 spraying nozzle
5 hood
6 creping blade
7 macrofolded tissue paper
8 contact edge
9 sliding wear surface
10 front bevel surface
11 roughness
12 waviness
13 lay
20 leading side
21 prebevel
25 wear resistant coating
30 trailing side
40 top side
71 microfolds
72 pile of microfolds
73 macrofolds

The invention claimed is:

1. A blade for creping a paper web from a dryer cylinder surface, the blade comprising:

a blade body having a leading side and a front bevel surface;

said leading side and said front bevel surface meeting at a contact edge;

said contact edge being configured to contact the dryer cylinder;

said front bevel surface extending at least 150 μm from said contact edge in a thickness direction of the blade and to be impacted by the paper web; and said front bevel surface having a 3D areal roughness, measured according to ISO 25178, with at least one of:

Sa>0.7 μm, or

Sz>18 μm, or

Sq>1.0 μm.

2. The blade according to claim 1, wherein portions or all of said front bevel surface have a 3D areal roughness, measured according to ISO 25178, of at least one of:

Sa between 0.7 μm and 9 μm; or

Sz between 18 μm and 100 μm; or

Sq between 1.0 μm an 11 μm.

3. The blade according to claim 1, wherein a bevel angle β between said leading side and said front bevel surface lies between 60° and 110°.

4. The blade according to claim 3, wherein the bevel angle ß lies between 70° and 95°.

5. The blade according to claim 1, wherein a macroscopic shape of said front bevel surface is flat or has a macroscopic topography.

6. The blade according to claim 1, wherein said front bevel surface has an undulatory topography.

7. The blade according to claim 1, wherein said front bevel surface extends at least 250 μm from said contact edge, over an entire top side of the blade.

8. The blade according to claim 7, wherein said front bevel surface extends at least 350 μm from said contact edge, over the entire top side of the blade.

9. The blade according to claim 1, being a steel blade having a Vickers hardness in a range of 350 HV to 600 HV.

10. The blade according to claim 9, further comprising a deposit of a wear-resistant material.

11. The blade according to claim 10, wherein said wear-resistant material is a ceramic based material comprising at least one of a metal oxide, a metal carbide, a metal nitride, or combinations thereof.

12. The blade according to claim 11, wherein said ceramic based material is a composite comprising particles of least a metal oxide, a metal carbide or a metal nitride distributed in a metallic matrix material.

13. The blade according to claim 10, wherein said deposit has a Vickers hardness in a range from 900 to 1700 HV.

14. The blade according to claim 1, wherein at least portions of said leading side have a roughness of Ra<0.4 μm and Rz<4.0 μm.

15. The blade according to claim 1, having a thickness in an x-direction between 600 μm and 1500 μm.

16. A creping arrangement, comprising:

a dryer cylinder; and a blade according to claim 1 for creping a paper web from a surface of said dryer cylinder.

17. The creping arrangement according to claim 16, wherein a contact angle α between said blade and said dryer cylinder lies between 5° and 35°.

18. The creping arrangement according to claim 17, wherein the contact angle α lies between 15° and 25°.

19. The creping arrangement according to claim 16, wherein a pocket angle δ between a tangent to said dryer cylinder at said blade tip contact and said front bevel surface lies between 115° and 35°.

20. The creping arrangement according to claim 19, wherein the pocket angle δ lies between 85° and 70.

* * * * *